United States Patent Office

2,719,140
Patented Sept. 27, 1955

2,719,140

STABILIZED ACRYLONITRILE COPOLYMERS

Robert J. Slocombe, Dayton, and George L. Wesp, Englewood, Ohio, assignors to Monsanto Chemical Company, St. Louis, Mo., a corporation of Delaware No Drawing. Application May 20, 1953,
Serial No. 356,296

8 Claims. (Cl. 260—45.85)

This invention relates to methods of preparing polymers of acrylonitrile which are stabilized with respect to thermo-discoloration. More specifically the invention relates to methods of converting unstable polymers of acrylonitrile into color-stable polymers.

Although polyacrylonitrile and copolymers of 50% or more by weight of acrylonitrile and other monomers containing olefinic unsaturation copolymerized therewith are generally regarded as being materials of good thermostability, they are subject to discoloration. This phenomenon generally results because of the necessity for extruding and molding the composition at elevated temperatures. Furthermore, the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color-stable polymers of acrylonitrile. A further process of the invention is to facilitate molding and other processing procedures without the danger usually encountered at elevated temperatures, resulting in the deterioration of fibers and other forms of acrylonitrile polymers. A still further purpose of the invention is to provide substances which can be added to conventional polymers to induce resistance to heat discoloration.

It has been discovered that by adding magnesium alkyl maleates having from 1 to 14 carbon atoms in the alkyl radical to acrylonitrile polymers improved resistance to discoloration may readily be developed. The nature of the chemical reaction involved is not definitely understood, but it is believed that the color change is due to some impurities present in the polymer. It may be that the maleate or alkyl radicals or magnesium ions react with the impurity to form a substance which contributes less to thermal discoloration than the impurity in its original form. Since not all maleic acid derivatives produce the same degree of beneficial effect, the phenomenon apparently involves additional stabilization by the metal as well as the acid portion of the compound. The total stabilization may involve additive or synergistic effects. Irrespective of the mechanism it has been found that maleates having from 1 to 14 carbon atoms in the alkyl radical such as magnesium octyl maleate produce the desired effect.

The acrylonitrile polymers with which this invention may be practiced include polyacrylonitrile and copolymers of from 20 or more per cent acrylonitrile and up to 80% of one or more of a wide variety of other unsaturated substances known to be copolymerizable with the acrylonitrile. Thus, the invention is practicable with the well-known fiber-forming copolymers of acrylonitrile which may be the copolymers of 75% or more of acrylonitrile and up to 25% of other monomers. Other copolymers of from 25% to 75% acrylonitrile and 75% to 25% of various other monomers, which copolymers have primary utility in the field of film and molding composition production are also useful.

The said other monomers with which the acrylonitrile may be copolymerized to produce resinous substances capable of use in the practice of this invention include vinyl acetate and other vinyl esters of monocarboxylic acids having up to 4 carbon atoms in the carboxylic acid radical, dimethyl fumarate and other alkyl esters of fumaric acids wherein the alkyl radical has up to 4 carbon atoms, methyl methacrylate or acrylate and other alkyl acrylates and alkyl methacrylates wherein the alkyl radical has up to 4 carbon atoms, vinyl chloride and other vinyl halides, styrene, alpha-methylstyrene, and other vinyl and isopropenyl substituted aromatic hydrocarbons, methacrylonitrile, vinylidene chloride, vinylpyridine, the vinyl derivatives of other alkyl substituted pyridines and the vinyl derivatives of other compounds containing a tertiary amino atom in a heterocyclic ring, vinyl chloroacetate and vinyl esters of haloacetic acids, methallyl chloroacetate, allyl chloroacetate and chloroallyl chloroacetate, and the corresponding esters of other haloacetic esters, vinylimidazole and other N-vinyl derivatives of heterocyclic nitrogen compounds, and one or more of these and other unsaturated compounds known to be copolymerizable with acrylonitrile.

The magnesium alkyl maleates useful in the practice of this invention are the magnesium alkyl maleic compounds in which the alkyl radical has from 1 to 14 carbon atoms. A preferred group is the group in which the alkyl radical has from 4–14 carbon atoms and a more preferred group is that in which the alkyl radicals have from 6–12 carbon atoms. A preferred example is magnesium octyl maleate.

In the practice of this invention the stabilizer may be used to the extent of 0.01% to 10% by weight of the acrylonitrile polymer to be stabilized. Preferred practice of this invention involves the use of 0.1% to 3% of the stabilizer.

The invention may be practiced by combining the acrylonitrile polymer and the magnesium alkyl maleate by a wide variety of mechanical procedures. Thus, the polymer may be treated in granular solid form and mixed physically with the compound or in aqueous or liquid solution or dispersion of the compound. The physical mixture may take place at room temperature or at higher temperatures, for example, the temperature at which the polymer is semi-solid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will, to a large extent, depend upon the chemical composition of the acrylonitrile polymers.

The copolymers of 75% or more of acrylonitrile and up to 25% of the comonomer are well-known fiber-forming compositions and are generally resistant to the effect of most chemical solvents. In the preparation of solutions of such copolymers, solvents such as N,N-dimethylformamide, N,N-dimethylacetamide, gamma-butyrolactone, ethylene carbonate, acrylic acid, cinnamic acid, alpha-cyanoacetamide, and tris(dimethylamido) phosphate may be used.

In the treatment of the more soluble types of acrylonitrile polymers, for example, those of from 20% to 75% acrylonitrile and from 25% to 80% of other monomers copolymerizable therewith, the selection of a solvent is less critical. This type of copolymer may be dissolved by the various ketones, esters and aromatic hydrocarbon types of solvents. In general, the copolymer is placed in a suitable solution or softened and swelled by the selected medium so as to enable a more ready dispersion of the magnesium alkyl maleate within the solid polymer. Obviously, a solvent which is also capable of dissolving, at least to some extent, the magnesium alkyl maleate to be used will be exceptionally beneficial. However, the selection of the dispersing agent, the stabilizing agent and the particular method of dispersing the compounds in the solid polymer is a matter readily determined by one skilled in the art.

To evaluate the stabilizing action of various compounds, acrylonitrile polymers of different chemical and physical properties were used and the compound dispersed therein by a variety of methods. The magnesium alkyl maleates having from one to fourteen carbon atoms in the alkyl radical are of utility in the present invention.

The following examples are set forth in order to illustrate methods of carrying out the present invention:

*Example 1*

As an example of the present invention, ten parts of polyacrylonitrile was treated with an aqueous solution of one part of magnesium octyl maleate. The mixture was heated over a steam bath to drive off the water. A sample of the treated polyacrylonitrile, and a reference sample of untreated polyacrylonitrile were then heated in glass tubes for ten minutes in a high temperature bath at 225–230° C.

It was found that the high-temperature heating caused the untreated sample to change from the initial, clear, colorless condition to a deep tan, whereas the treated sample remained as a white powder with only a very slight yellowing. It was also found that the treated sample after heating dissolved readily and completely in dimethylformamide to give a colorless solution, while the untreated sample dissolved only partially, even when the solution was heated to 95° C. The polymer solution in this case was a deep orange color, while the undissolvable deterioration products from the untreated polymer consisted of brown-colored, insoluble gel particles.

*Example 2*

A test was carried out employing magnesium octyl maleate as a 10% solution in toluene as the means of application of the stabilizer on polyacrylonitrile to achieve a 10% stabilizer content. It was found that the magnesium octyl maleate dissolved completely in the toluene so that the solution could readily be comingled with the polyacrylonitrile to achieve thermal stability. By comparison it was found that magnesium maleate when provided as a 10% dispersion in toluene dissolved only to a minor degree so that a clear solution could not be provided for uniform application to the acrylonitrile.

The present method is particularly advantageous when applying the stabilizer during milling operations to acrylonitrile polymers. Such operations are conducted on steam heated metal rolls at temperatures of about 150° C. so that water cannot readily be employed.

Various other organic solvents such as halogenated aromatic compounds (chlorinated benzenes and chlorinated biphenyl), dioctyl phthalate, and alkylated aromatics, such as xylene, ethylbenzene, etc., may be similarly employed. It is found that the organic vehicle is readily evaporated from the treated acrylonitrile polymer leaving the acrylonitrile uniformly contacted with the stabilizer to achieve thermal stability.

*Example 3*

The test of Example 3 above was similarly carried out with the use of magnesium dodecyl maleate as a solution containing 0.1 g. in 20 cc. of toluene for application to one gram of polyacrylonitrile. The treated polymer was found to possess thermal stability being practically unchanged when subjected to the heating test of Example 1. The magnesium dodecyl maleate was likewise found to be substantially completely soluble in the toluene permitting ready and uniform application of the toluene solution to the polyacrylonitrile.

The preparation of the novel stabilizers of the present invention is shown in the following examples:

*Example 4*

A mixture of 0.11 mole of maleic acid and 0.10 mole of dodecyl alcohol was heated at 90° C. for 3 hours. The reaction mixture was then washed with water to remove excess maleic acid and yielding dodecyl acid maleate. The dodecyl acid maleate in stoichiometric proportion with magnesium oxide was then heated for one hour at 90° C. with stirring to give a substantially quantitative yield of magnesium octyl maleate.

*Example 5*

The method of Example 5 was carried out to obtain magnesium octyl maleate. The reactants employed were 0.11 mole of maleic acid together with 0.10 mole of 2-ethylhexyl alcohol. After the formation of the 2-ethylhexyl acid maleate the reaction was completed by the use of a stoichiometric proportion of magnesium oxide to form magnesium octyl maleate.

*Example 6*

Magnesium dodecyl maleate was employed as a stabilizer with polyacrylonitrile using the above test of Example 1.

The magnesium alkyl maleates having from 1–14 carbon atoms, preferably from 6–12 carbon atoms, are of particular utility in the present invention. It has also been found that the present stabilizers render acrylonitrile more compatible with other polymeric components.

What we claim is:

1. A stable acrylonitrile polymer comprising a polymer of 20% to 100% of acrylonitrile and up to 80% of another monoolefinic monomer copolymerized therewith, said polymer containing intimately dispersed therein from 0.01% to 10% of a magnesium alkyl maleate in which the alkyl radical has from 1 to 14 carbon atoms.

2. A stable acrylonitrile polymer comprising a polymer of 20% to 100% of acrylonitrile and up to 80% of another monoolefinic monomer copolymerized therewith, said polymer containing intimately dispersed therein from 0.01% to 3% of a magnesium alkyl maleate in which the alkyl radical has from 1 to 14 carbon atoms.

3. A stable acrylonitrile polymer comprising a polymer of 20% to 100% of acrylonitrile and up to 80% of another monoolefinic monomer copolymerized therewith, said polymer containing intimately dispersed therein from 0.01% to 10% of a magnesium alkyl maleate in which the alkyl radical has from 6 to 12 carbon atoms.

4. A stable acrylonitrile polymer comprising a polymer of 20% to 100% of acrylonitrile and up to 80% of another monoolefinic monomer copolymerized therewith, said polymer containing intimately dispersed therein from 0.01% to 3% of a magnesium alkyl maleate in which the alkyl radical has from 6 to 12 carbon atoms.

5. A stable acrylonitrile polymer comprising a polymer of 20% to 100% of acrylonitrile, and up to 80% of another monoolefinic monomer copolymerized therewith, said polymer containing intimately dispersed therein from 0.01% to 10% of magnesium octyl maleate.

6. A stable acrylonitrile polymer comprising a polymer of 20% to 100% of acrylonitrile, and up to 80% of another monoolefinic monomer copolymerized therewith, said polymer containing intimately dispersed therein from 0.01% to 3% of magnesium octyl maleate.

7. A stable acrylonitrile polymer comprising a polymer of 20% to 100% of acrylonitrile and up to 80% of another monoolefinic monomer copolymerized therewith, said polymer containing intimately dispersed therein from 0.01% to 10% of magnesium dodecyl maleate.

8. A stable acrylonitrile polymer comprising a polymer of 20% to 100% of acrylonitrile, and up to 80% of another monoolefinic monomer copolymerized therewith, said polymer containing intimately dispersed therein from 0.01% to 3% of magnesium dodecyl maleate.

References Cited in the file of this patent

UNITED STATES PATENTS 2,484,216    Foster _____ Oct. 11, 1949